United States Patent [19]
Armstrong et al.

[11] Patent Number: 5,784,054
[45] Date of Patent: Jul. 21, 1998

[54] SURFACE ACOUSTIC WAVE TOUCHSCREEN WITH HOUSING SEAL

[75] Inventors: Donald B. Armstrong, Belmont; Jeffrey W. Asher, Oakland; Susan P. Benitez, Union City, all of Calif.; Richard A. Jones, Oak Ridge, Tenn.; Joel C. Kent, Fremont; Michael L. Lewis, Oakland, both of Calif.; Robert C. Phares, Knoxville, Tenn.

[73] Assignee: Elo ToughSystems, Inc., Fremont, Calif.

[21] Appl. No.: 621,127

[22] Filed: Mar. 22, 1996

[51] Int. Cl.$^6$ .................. B65D 53/00; G09G 5/00; G06F 3/03
[52] U.S. Cl. .................. 345/177; 277/630; 277/654
[58] Field of Search .................. 345/177; 277/654, 277/630, 637

[56] References Cited

U.S. PATENT DOCUMENTS

5,332,238  7/1994  Borucki .................. 277/228

*Primary Examiner*—Jeffery Brier
*Attorney, Agent, or Firm*—Milde, Hoffberg & Macklin, LLP

[57] ABSTRACT

An effective seal for protecting a touchscreen and associated electronics from liquid infiltration, the seal being placed between the housing and the surface of the touchscreen and configured to surround the useful touchscreen area. The seal is preferably formed of a closed cell foam covered on the surface which contacts the touchscreen surface with a liquid impervious barrier, or an expanded polymer such as expanded PTFE. The seal may be secured to the bezel edge by a transfer adhesive coating applied to the bezel edge, except for a relatively thin edge strip along the inner edge of the bezel end, so that substantially no adhesive is present on a free surface of the seal body proximate to the window aperture of the bezel. Preferably, a smooth surface is provided for adhering the seal body to the bezel. The seal body may be compressed between the bezel and touchscreen surface to effect a seal.

36 Claims, 3 Drawing Sheets

FIG.9

SURFACE ACOUSTIC WAVE TOUCHSCREEN WITH HOUSING SEAL

BACKGROUND OF THE INVENTION

The present invention relates to surface acoustic wave touchscreens; and more particularly to effecting a seal between the touchscreen surface and touchscreen housing.

A "surface acoustic wave", as defined herein, is an acoustic wave with sufficient power density at the surface to detect a touch due to a finger or stylus. Rayleigh waves, a type of surface acoustic wave with energy confined near one surface with no energy on an opposing face, are commonly used to detect touch. In practice, attempts to produce such waves result in quasi-Rayleigh waves, wherein over distances of interest, substantially all of the wave energy remains on one surface. By virtue of the high degree of wave energy confinement near one surface and its vertical component of particle motion, quasi-Rayleigh wave touch detection systems are especially sensitive to structures abutting the surface.

Conventional surface acoustic wave touchscreens operate at an acoustic frequency of about 5.0 to 6.0 MHz. These signals are attenuated by, e.g., liquids, human fingers, many types of polymers, and other types of objects in contact with the surface. Thus, the touchscreen can determine the position of a finger by determining a characteristic attenuation pattern. However, it is generally considered undesirable to have other potentially interfering sources of surface acoustic wave attenuation present in a touchscreen system. Thus, the prior art teaches that any object in contact with a touchscreen surface in proximity to which surface acoustic waves travel should have a low surface acoustic wave attenuation.

Surface acoustic wave touchscreens are often provided with a reflecting array of elements which distribute the acoustic energy across the substrate surface, disposed immediately under the housing window inner edge. These arrays are sensitive to accumulation of deposits, and therefore liquids in contact with these arrays would tend to adversely effect the touchscreen operation.

Surface acoustic wave (SAW) touchscreens are utilized as user interfaces to controls and computer based systems. SAW touchscreens are quite often utilized in point-of-sale (POS) systems especially in restaurants, fast food establishments, sweet shops, ice-cream parlors and other places where food and drinks are served or may otherwise come into contact with the touchscreen. Furthermore, in some applications glass cleaning fluids may be a potential source of chemical attack on sensitive components. For example, glass cleaning solutions may be acidic, containing, e.g., acetic acid.

The touchscreen itself, which comprises a sheet of glass and appropriate acoustic and electronic components, is encased in a display device housing with a window that exposes a portion of the glass touchscreen surface so that the user can touch specific places or locations on the screen surface and by doing so effect an input into the control device in a known manner. Conventional construction and fabrication materials often include plastic as the material of choice from which major portions, if not all, of the touchscreen and display device housing are fabricated.

Where no compliant seal is provided, the gap between the edge of the housing and the touchscreen should be uniformly narrow. However, the housing is generally rigid, and the edge of the housing and the touchscreen surface may not be perfectly parallel, especially where the touchscreen is curved. Thus, positioning one against the other may not provide an effective seal if the touchscreen is to be utilized in a "hostile environment". Such a hostile environment, for a SAW touchscreen, would be any environment where substances detrimental to the acoustic properties or electronic components housed within the touchscreen and display device housing might infiltrate the housing through whatever space there might be between the housing window edge and the touchscreen surface disposed proximate such edge, and upon doing so might damage one or more of the electronic or acoustic components housed therein. The utilization of surface acoustic wave touchscreens in restaurants, ice cream stores, fast food establishments and the like in fact presents such a hostile environment. Soda, water, tea, coffee, glass cleaning fluids, and other liquids, if spilled onto a touchscreen that does not have an effective seal between the window edge and touchscreen surface, may flow between the unsealed or poorly sealed window edge and touchscreen surface, and once inside the housing damage the components housed therein. Even a tight seal, if subjected to contact with liquids for an extended period, may permit such liquids, due to capillary action, to seep between the sealing member and touchscreen surface and into the SAW touchscreen and display device housing and so damage the electronic or acoustic components housed therein or adversely effect the performance.

U.S. Pat. No. 5,332,238 to G. Borucki for "Surface Acoustic Wave Touchscreen Sealing System" shows and describes ways of placing a seal between an upper housing of a surface acoustic wave touchscreen and a glass surface of the touchscreen. Borucki teaches that the seal should have a low attenuation of the acoustic wave, i.e., below the touch threshold, and further provides a seal formed of foam, having an open cell structured face adjacent to the touchscreen to minimize surface acoustic wave absorption. This open cell structure adjacent the touchscreen surface forms a potential space in which liquids may become trapped and therefore suffer impeded egress or evaporation. The Borucki seals also require an upper housing construction that includes a channel formed into the under surface of the housing proximate an edge thereof and disposition of a membrane on vertically disposed surfaces of the seal, so that the membranes extends from at least an under surface of the touchscreen housing to the upper surface of the glass touchscreen. The channel to receive the seal member of Borucki incurs an extra cost. Further, a gap may remain between the under surface of the housing and the upper surface of the glass touchscreen, forming a reservoir to capture spilled liquids adjacent to the seal. The vertical membrane that forms so important a part of the Borucki seal may not prove to be as effective a seal as required for liquids where it abuts the glass touchscreen surface, and may otherwise not be appropriate for intended uses of surface acoustic wave touchscreens.

Of particular interest is the case in which the housing is a bezel, with no substantial modifications, of an existing CRT based monitor display device.

Two seals have been developed for sealing commercial products by Elo TouchSystems, Inc. In one example, an open-cell foam strip with preapplied contact adhesive, Scotch(TM) brand 3M 4317 single-coated polyester urethane foam tape, was used; while an effective dust seal, its performance was limited with regard to liquids. In a second example, an 2mm thick expanded PTFE (polytetrafluoroethylene) strip with contact adhesive coating on the full quarter-inch width of one side was used. Furthermore, experiments have been conducted with a closed cell polyolefin foam strip with a pressure-sensitive contact adhesive covering one side.

SUMMARY OF THE INVENTION

It is a principal object of the present invention to provide new and novel sealing method and seal provided between the touch surface of a SAW touchscreen and the upper housing forming an opening or window through which said touch surface may be touched.

It is still another object of this invention to provide a new and novel sealing method and seal formed between a touch surface of a surface acoustic wave touchscreen and an edge of a housing that fits over and surrounds said surface and forms an open window through which said touchscreen may be touched.

It is yet still a further object of this invention to provide a new and novel sealing method for effecting a seal between an edge of a housing and the touch surface of a SAW touchscreen.

It is yet a further object of this invention to minimize the risk of wetting the interface between the seal and touchscreen via capillary action.

It is another object of the invention to provide a sealing structure which avoids recesses in which liquids may accumulate in proximity to an aperture or window for accessing a touch-sensitive front surface of a touchscreen.

It is a still further object of this invention to provide a sealing solution for display devices, e.g., CRT-based monitors, in which the original display device length may be used, without requiring replacement or modification of the normal housing or bezel in the sealed touchscreen display device.

One aspect of the present invention involves a surface acoustic wave touchscreen in combination with a display device and its housing such that the housing includes a window providing access to the touch surface of the touchscreen and wherein there is a seal positioned between the touch surface and an end surface of the housing surrounding and closest to the window; the seal including a body of predetermined thickness and width and an uninterrupted length preferably at least long enough to encompass the housing end surface, the seal further a liquid impervious barrier provided on at least a surface intended to be adjacent to the surface of the touchscreen. According to one embodiment, at least a pair of such liquid impervious barriers are provided, one against the surface of the touchscreen and another against a portion of the housing.

Note that in the instant invention, and in contrast to Borucki, the barrier is on a surface of the seal body touching the touchscreen, while in Borucki a pair of membranes are provided on the vertical surfaces of the seal, perpendicular to the touchscreen surface, and do not cover in any significant way the housing end surface nor the touchscreen.

In accordance with yet another aspect of the invention, the seal is formed from an expanded polymer material such as expanded PTFE (poly-tetrafluoroethylene). Such a material is not a foam, and does not contain macroscopic gas filled voids or "cells" characteristic of foam. It does, however, provide a low average mass density of interest to controlling acoustic losses due to the seal. The outer aspect of such material is generally water impermeable. While more costly than many foams, expanded PTFE has improved fire and chemical resistance which may be advantageous in certain circumstances.

In accordance with another aspect of the present invention the seal covers the entire predetermined width of the housing end surface and extends beyond same to both sides thereof.

In accordance with yet another aspect of the invention the seal is formed from closed cell, foam, i.e., a foam composed of fully bounded voids, limiting fluid flow therethrough. A high cell-density foam, e.g., having a large number of closed cells per volume, provides a lower potential for fluid accumulation at the surface, while a low density foam generally results in lower acoustic attenuation.

In accordance with yet a further aspect of the invention the seal is secured by a transfer adhesive to the end surface of the housing. This transfer adhesive is provided having a width smaller than a width of the sealing body, and thus adhesive does not generally protrude beyond the limits of the narrower housing end surface. Thus, in contrast to pre-applied contact adhesives on foam strips, which are generally provided on the entire side of a foam seal body, and therefore suffer from a "fly paper" effect for any portion of the foam which extends beyond the element to which it is adhered, a transfer adhesive may be provided with specifically defined locus, and therefore avoid the "fly paper" effect.

In accordance with yet another aspect of the invention, the seal is compressed between the housing end surface and the touchscreen surface, to effect a compression seal and to accommodate mechanical variations in the fit of the touchscreen to the housing and small movements.

Another embodiment of the present invention further involves the method of sealing a space between the touch surface of a surface acoustic wave touchscreen and an edge surface of a bezel of the housing surrounding the touch surface so as to maintain acoustic absorption within acceptable limits, e.g., preferably less than about 6 dB attenuation; wherein the seal may be fabricated from a tape of high cell density, closed cell, foam and carries on respective face surfaces thereof liquid impervious membrane barriers such that when the seal is disposed between the touch surface and the bezel (housing) edge surface one membrane covered surface is disposed against the touchscreen touch surface and the other membrane surface is disposed against the bezel edge surface.

According to an aspect of the present invention, the seal acoustic attenuation need not be negligible, and indeed may be quite significant, due to the use of a controller and sensor arrangement which compensates for the attenuation of the seal, and/or ignores any time-variant change in the acoustic attenuation of the seal which would otherwise produce artifacts. Thus, an adaptive controller may be used to compensate for significant acoustic attenuation.

It is another object according to the present invention to provide inherent rejection of seal-compression induced touch artifacts by limiting a range of an acoustic reflective array to within a bound of an open window or aperture of a display bezel.

It is a still further object according to the present invention to provide electronic rejection of seal-compression induced touch artifacts by providing an electronic window for blocking analysis of acoustic wave attenuation in proximity to the seal.

It is a yet another object according to the present invention to provide a self-calibrating controller with a sealed touchscreen bezel to filter artifacts due to seal surface acoustic wave attenuation.

Other objects, features and advantages of the invention in its details of construction and arrangement of parts will be seen from the above and from the following description of the preferred embodiment when considered with the accompanying drawings.

DESCRIPTION OF THE PREFERRED EMBODIMENT

Figure 1:
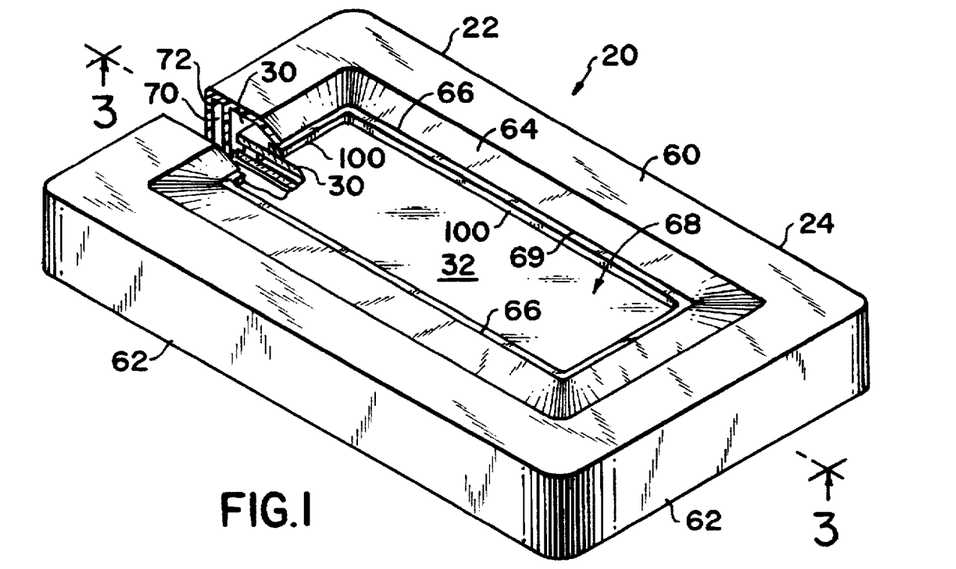
FIG. 1 is a perspective view of a surface acoustic wave touchscreen incorporating the instant invention, cut away in part to better show details thereof.
Figure 2:
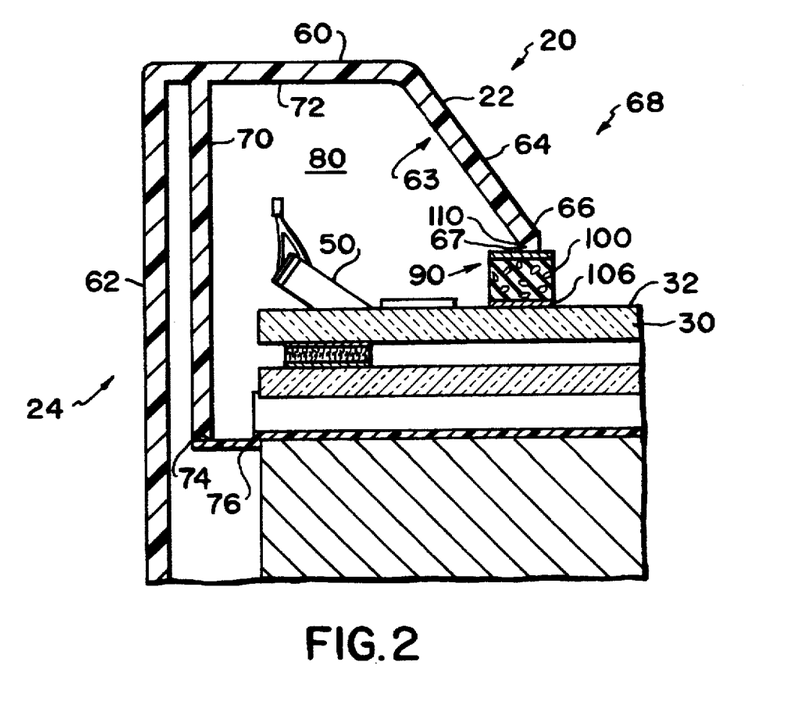
FIG. 2 is a vertical section through an edge of the touchscreen upper housing and touch surface of the touchscreen of FIG. 1 enlarged to better show details thereof.

With reference to FIGS. 1 and 2 there is generally shown at 20 a surface acoustic wave (SAW) touchscreen including an upper portion 22 of a monitor housing assembly 24 and a glass touchscreen 30 having a touchscreen surface 32. Surface acoustic wave electronic and transducer components 50 (FIG. 2) of conventional construction are housed within housing assembly 24 and coact with touchscreen 30 to generate and receive surface acoustic waves in a conventional manner and which coact in a conventional manner so that the touchscreen may function, for example, as a computer or control input device.

Upper housing 22 of housing assembly 24 is preferably fabricated from molded plastic and is conventionally secured in place as a part of housing assembly 24. Upper housing 22 includes an upper wall 60 (FIGS. 1–3) surrounded by a peripheral sidewall 62. An inner bezel 64 extends inwardly and downwardly from upper wall 60 to terminate at an inner circumferential edge 66, with an edge end or bottom surface 67 and that defines an open window 68. An inner rib 70 extends down from an inner surface 72 of upper wall 60 to terminate at an edge 74 sized and disposed to rest upon a ledge 76 (FIGS. 1 and 2) suitably mounted within housing assembly 24. Inner rib 70, upper wall 60 and an inner surface 63 of bezel 64 surround and define an inner space 80 (FIGS. 1 and 2) within and under upper housing 22.

When upper housing 22 is secured in position on ledge 76, by conventional means such as threaded members (not shown) or the like, edge 66 of bezel 64 is drawn towards upper surface 32 of screen 30 and would, when finally positioned and because of the length of rib 70, leave a space 90 (FIG. 2) between bottom surface 67 of edge 66 of bezel 64 and upper surface 32 of screen 30. A seal 100 is, however, provided for space 90.

As noted in Borucki, it is not necessary to provide a liquid impervious barrier on all faces of a sealing body. Borucki proposes that the seal surfaces which are substantially open to liquid contact include a smooth sealing barrier. However, in order to minimize acoustic attenuation, the seal surface in contact with the acoustic touchscreen should have an open cell face.

In contrast, the present inventors have shown that the open edges of the seal body need not be smooth, and further that a seal surface in contact with the acoustic touchscreen need not be acoustically transparent and may in fact have a smooth, acoustically absorbing surface which limits fluid accumulation.

Where a foam material is employed, the bulk of the foam should be liquid impervious, e.g., bulk fluid transfer through the seal should be substantially blocked. Preferably at least one surface of the elongated seal body is composed of a membrane or skin surface that is liquid impervious, which may be integral with the foam material, and this surface preferably seals against the acoustic touchscreen. As used herein, the term "liquid impervious" means that water and similar liquids, such as milk, juice and other water-based fluids will not pass through the seal in their acoustically absorptive liquid state. The sealing body, however, may pass vapor and/or gasses without affecting acoustic performance and without allowing liquids to damage protected components. The liquid impermeable skin or membrane can be of the same material as the closed cell foam body and preferably is formed as an integral part of the foam body, which may be done during the manufacture of the foam by molding or extruding or heat treatment, or may be formed as a laminate of the same or a different material. The thickness of the membrane is not critical as long as it is liquid impervious and does not cause excessive attenuation of the SAW signal. Typical skin thickness of suitable sealing materials are estimated to be thin, e.g., significantly smaller than a Rayleigh wavelength, e.g., less than about 0.025 inch.

Flexible plastic foams envisioned include polyurethane, rubber, latex, polyethylene and vinyl polymers. Such foam is commercially available in sheets or rolls having an integral membrane or skin surface, e.g., on top and bottom surfaces. When forming such foams as sealing bodies, an open cell membrane edge may result from cutting through a sheet of foam with a knife, razor blade or other sharp instrument. Thus, the portion of the foam body along the cut will have an open cell surface. According to the present invention, this open cell surface is not required, but if present, may be provided as a free edge of the sealing body, protruding from between the touchscreen surface and the housing edge.

For gasketing materials such as expanded PTFE, for which there are no "cells", a membrane skin is not needed to provide a smooth water impervious surface.

A preferred material for the seal of the instant invention is of Volara 2AF manufactured by Voltek Division of Sekisui America Corp. of Lawrence, Mass. The foam is manufactured to contain a large number of small void cells per volume. Volara 2AF is radiation cross linked, hence reducing the mass density required to obtain mechanical performance of comparable non radiation cross-linked polyethylene foams.

Figure 4:
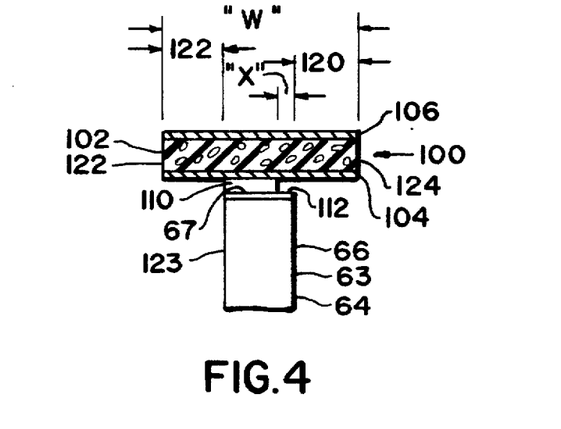
FIG. 4 is a vertical view of an edge of the upper housing and the seal of FIG. 3 as applied thereto.

According to another aspect of the invention, a laminate or composite seal structure is provided, e.g., with only the portion of the sealing body which acoustically interacts with the surface of the touchscreen provided as a low acoustic attenuation material, and therefore other portions of the seal body may be optimized for, e.g., shock absorption, resiliency or to accommodate variable sized spaced between the housing and the touchscreen surface. For example, a laminated contact layer with the acoustic touchscreen may include a water impervious layer 106 of material which has low acoustic attenuation properties backed by a resilient, more acoustically absorptive material 102 (FIG. 4).

Figure 3:
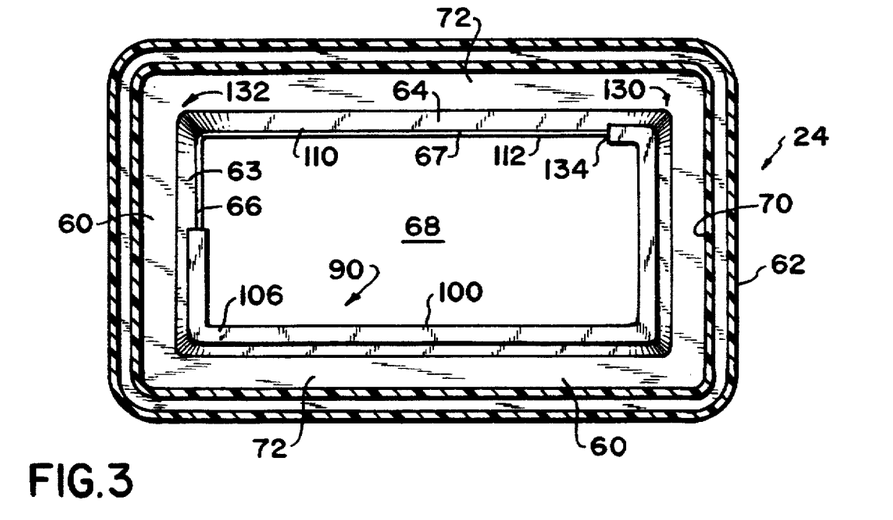
FIG. 3 is a bottom plan view of the upper housing showing application of the seal thereto.

Seal 100 is applied to bottom surface 67 of edge 66 of upper housing 22 by first placing housing 22 bottom side up as shown in FIG. 3. A strip of a suitable transfer adhesive 110 (FIGS. 2, 3 and 4) is first applied to the full length of bottom surface 67 of edge 66 of bezel 64.

The transfer adhesive may also be offset so that no adhesive is exposed in the finished product. This provides a cosmetically attractive seal without restriction on the color of the transfer adhesive, which for example is 3M 4920, a white transfer adhesive available from 3M Company. This also avoids a sticky or tacky feel to the product when a user's finger touches the seal. It also avoids a flypaper effect which would otherwise collect and retain dirt in the region of the seal. The inventors have demonstrated, with NSTA standard drop testing, that such an off-set transfer adhesive reliably holds the foam in place. Thus, the transfer adhesive is applied to almost the full predetermined width of the housing end surface, except for a relatively thin path, 112, proximate an inner surface of the end surface along the entire length of bottom surface 67 of edge 66 of bezel 64. Thin, uncovered path 112 is of a defined width "x" (FIG. 4) which may be up to 1/32 of an inch wide and also extends completely around bottom surface 67 of edge 66 of bezel 64 along inner surface 63 of bezel edge 66.

The width "w" (FIG. 4) of seal 100 is selected so that it provides an overhang 120 extending out from surface 63 of bezel 64 into space 80, under upper housing 22 and an overhang 122 extending out from an outer surface 123 of edge 66.

When applying seal 100 against transfer adhesive 110, it is preferable to start proximate an upper corner 130 or 132 of bezel edge 66 and with a straight edge 134 for seal 100. Seal 100 is thereafter applied to transfer adhesive 110 around the entire circumference of bezel edge 66 (only partially shown in FIG. 3) until seal 100 is again cut straight and fitted against edge 134 of strip 100. When so applying seal 100, special attention is given as each corner is turned so as not to stretch or pull seal 100. The seal 100 includes a water impervious layer 104 laminated on absorptive material 102, the layer 104 being in contact with the transfer adhesive.

After seal 100 has been so applied to bezel edge 66 of upper housing 22 the upper housing is turned over and secured to ledge 76 as described above. The thickness of seal 100 is preferably selected so that it not only fills all of space 90 but also so that seal 100 may be compressed nominally by 50% with actual compression sometimes varying greatly, e.g., in the range of 20% to 80% This acceptable range of compression enables the invention to provide a successful seal even when it is difficult to maintain tight mechanical tolerances for the gap between the bezel edge 66 and the upper surface 32 of the touchscreen 30. The seal body material is therefore selected such that under the acceptable range of application, the acoustic absorption properties of the material are appropriate. Preferably, under worst case, e.g., 80% compression, the seal body attenuates the surface acoustic wave by no more than about 12 dB, with an average attenuation, e.g., at 50% compression, of no more than about 6 dB, and with effective sealing when subjected to minimum compression, e.g., 20% compression. More preferably, maximum attenuation is limited to about 6 dB. It is noted that the normal touch acoustic wave attenuation threshold of an acoustic touchscreen is a fraction of a dB, and therefore the present design allows acoustic attenuation by the seal significantly in excess of this threshold, in addition to suppression of artifacts associated with such a seal. Thus, the present invention provides greater flexibility in the selection of sealing materials as compared with the prior art.

When disposed adjacent the housing upper surface 32 of the touchscreen 30, the seal 100 will thus be effective to prevent infiltration of fluids into housing assembly 24 while allowing effective operation of the touchscreen system.

Figure 5:
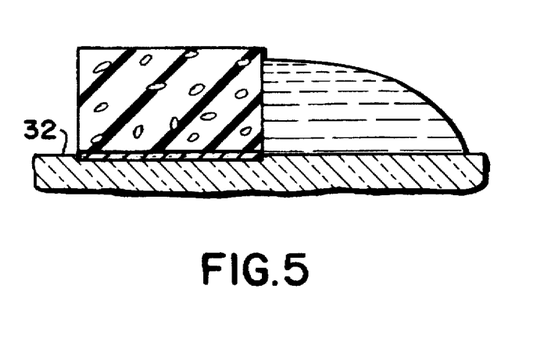
FIG. 5 is a vertical view of the invention showing standing liquid against the seal.

FIG. 5 is a vertical view of the seal according to the present invention showing standing liquid against the seal.

Note that liquid impervious membranes are provided on the horizontal surface of the seal with the vertical surfaces of the seal having open cells facing the standing water. FIG. 5 shows a schematic of the instant invention where a closed cell sealing body is provided having sealed surfaces opposed to the touchscreen glass surface and the adhesive/housing end and open cut surfaces facing the window made by the housing disposed proximate to the touchscreen. Shown thereon is standing liquid against the open cell surface of the foam seal. Due to the nature of the manufacture of the foam seal, with integral membrane surface, liquid does not flow due to capillary action between the ordinary density volume of the seal and the membrane. Liquid only penetrates minimally beyond the interval beyond open cell surfaces (shown vertically) facing the standing liquid. Wetting on this facing surface is weakly coupled to acoustic waves and dries quickly because it is exposed, as shown in FIG. 7.

Figure 6:
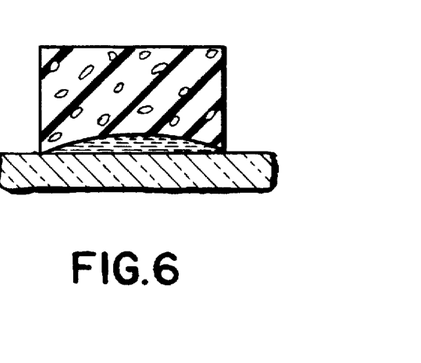
FIG. 6 is a vertical view of the seal of Borucki under the circumstances of FIG. 5.

FIG. 6 is a vertical view of the Borucki seal method under the circumstances of FIG. 5. Note that the vertically placed membrane avoids sponge absorption of liquid at that surface, but since the seal-touchscreen interface has no membrane covering the foam of the seal, any water that leaks or flows into the interface enters the open cells there. Due to lack of air exposure, liquids in this potential space require extended periods to dry and can affect acoustic properties at the touchscreen-seal interface for long periods of time. In particular, the coupling of acoustic waves to liquids is influenced by the distance to the touchscreen surface. By providing a high surface area member directly adjacent to the touchscreen surface, a quantity of liquid may be held in close proximity to the surface.

Figure 7:
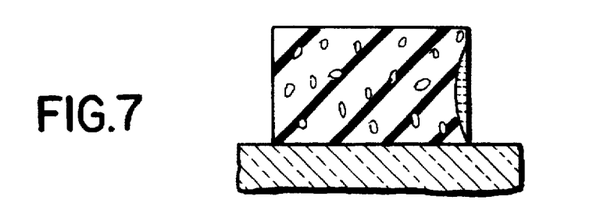
FIG. 7 is a vertical view of the invention showing the advantages over Borucki.

In contrast, as shown in FIG. 7 of the present invention, where fluids do accumulate on the vertical cut cell surface, only a small portion is in close proximity to the touchscreen surface, the remainder being distant and therefore having little effect on the acoustic wave.

FIG. 7 is a vertical view of the invention showing its advantages over Borucki. Due to the membrane at the touchscreen-facing side of the seal, no water can reach an open cell and thus very little, if any, water can penetrate. Any water within the gap between the touchscreen and the seal is subjected to compression, which tends to eject it, thus limiting accumulation and facilitating drying. Wetting on the vertical surface is weakly coupled to acoustic waves and dries quickly because it is exposed to air.

In FIG. 5, capillary action, given sufficient time, e.g., hours, can transport liquid along the interface between the foam and touchscreen surface 32. This makes it desirable to avoid puddle formation after a system is subjected to a splash of liquid. Seeping fluids, particularly if they are chemically corrosive ingredients such as glass cleaning fluids, can damage acoustic and electronic components inside the housing.

Figure 8:
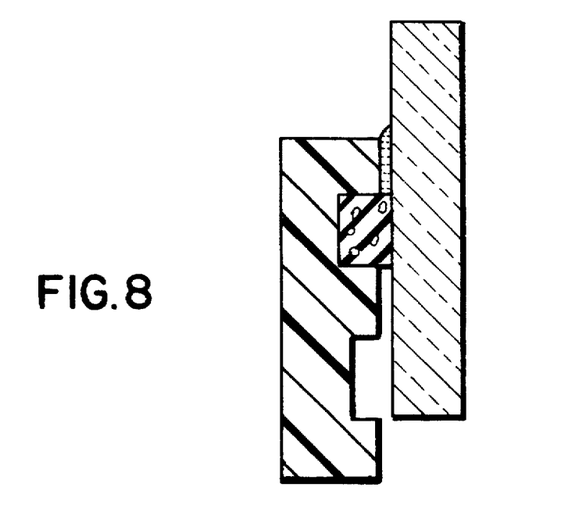
FIG. 8 is an illustration of puddle trap formation in Borucki.

FIG. 8 is an illustration of the puddle trap formation inherent in the Borucki channel method of overhanging housing (i.e., void internal to the edge of the housing).

Figure 9:
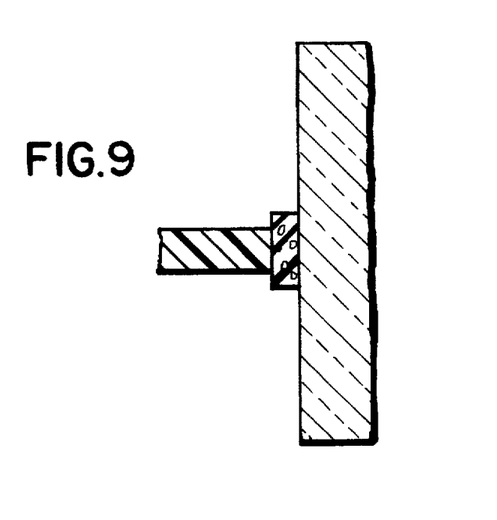
FIG. 9 illustrates how the instant invention avoids puddle formation.

FIG. 9 illustrates how the instant invention avoids puddle trap formation by not having a housing edge surface beyond the seal (i.e., the housing does not overhang the seal). In fact, according to the present invention, the seal body may be visible or protrude within the inner edge of the housing window The seal body may be provided in a configuration wider than the lip/edge lateral dimension of the bezel of the housing, which, e.g., may keep the foam seal in place in case of trauma or vibration. Additionally, this would assist in preventing cavities between the bezel and the glass.

The inventors have observed reliable touchscreen operation even in cases where the seal absorbs 6 dB of signal or more, whereas a touch threshold is typically a fraction of a dB. Reliable operation of the touchscreen with an acoustically absorptive seal may be achieved by an adaptive touchscreen controller which captures a reference signal and compares new readings to the reference signal, rather than relying on an absolute and invariant touch threshold. Thus, the sealing material and configuration thereof need not be selected primarily based on sub-threshold acoustic attenuation, and therefore may be selected based on other advantageous properties, such as resiliency, environmental properties, chemical, thermal and UV resistance, and flammability. Thus, the static properties of the seal may be compensated.

Because a large mechanical force on the bezel can modulate the compression of the seal and hence its acoustic absorption, and because the absorption of the acoustic signal from the seal body is typically larger than the touch threshold, such a change in absorption of the seal or pressure can generate a "false touch". An algorithm may therefore be provided in the controller which eliminates x and y "touch" coordinates outside of the window, that is, slightly inside the bezel edge coordinates, which is useful in eliminating false touch effects of seal compression. Further, in order to provide an inherent rejection of attenuation modulation outside this window, touchscreens with shortened reflective arrays, which reduce the ranges of X and Y sensitive to touch may be employed. This provides a convenient means to force the algorithm to ignore touch coordinates outside the desired windows without any customization of the controller's firmware. This also allows simplified firmware in the controller to provide self calibration functions, e.g., to determine the size of the touch sensitive window and operate accordingly.

From the above description it will thus be seen that there has been provided an effective liquid seal between the housing and touch surface of a SAW touchscreen without detrimentally affecting the performance of the touchscreen.

It is understood that although there has been described the preferred embodiment of the invention that various modifications may be made in the construction and fabrication thereof without departing from the spirit as comprehended by the following claims.

What is claimed is:

1. A seal system for a surface acoustic wave touchscreen including a screen having a touch surface disposed to be selectively touched and a housing mounting the screen, the housing including at least one open window disposed proximate and surrounding the touch surface of the screen and including a housing end surface having two sides thereto and an inner surface, disposed proximate to and surrounding the open window and spaced from the touchscreen touch surface by a seal space, and a seal disposed in the seal space between the housing end surface and the touchscreen surface proximate thereto for filling the seal space, said seal comprising:

(a) sealing body having a predetermined thickness and width, said predetermined thickness being at least sufficient to fill said seal space between the housing end surface and the touchscreen surface disposed proximate thereto, said sealing body having a liquid impervious barrier and allowing transmission of at least a portion of a surface acoustic wave adjacent thereto;

(b) said liquid impervious barrier covering at least said width of said sealing body so as to provide an outer covering surface;

(c) said outer covering surface being disposed adjacent the touchscreen surface when said sealing body is disposed in said seal space;

(d) an adhesive, for adhering said sealing body to said housing inner surface, having a width smaller than said width of said sealing body, so that said adhesive may be sandwiched between said sealing body and said housing inner surface.

2. The seal system of claim 1, wherein housing end surface has a width, said predetermined width of said sealing body being at least equal to said width of said housing end surface.

3. The seal system of claim 2, wherein said predetermined width of said sealing body is wider than said width of said housing end surface and when disposed in said seal space covering at least said width of said housing end surface and extending out beyond same to at least one said side of said housing end surface.

4. The seal system of claim 3, wherein said predetermined width of said sealing body and the positioning thereof is such that said sealing body extends out beyond each said side of said housing end surface.

5. The seal system of claim 1, wherein said sealing body is provided with a second outer surface disposed proximate the housing end surface when said sealing body is disposed in said seal space.

6. The seal system of claim 5, wherein said second outer surface is secured to said housing end surface by a transfer adhesive.

7. The seal system of claim 6, wherein housing end surface has a width, said transfer adhesive being applied to almost the full width of said housing end surface except for a relatively thin path proximate an inner surface of said end surface thereof.

8. The seal system of claim 1, wherein at least said sealing body comprises a closed cell foam.

9. The seal system of claim 1, wherein a bulk of said sealing body comprises a closed cell polyolefin foam material.

10. The seal system of claim 1, wherein said sealing body comprises expanded PTFE.

11. The seal system of claim 1, wherein said sealing body is provided as a continuous length strip.

12. The seal system of claim 1, wherein said seal body is positioned between said housing end surface and said touchscreen and compressed between said housing and said touchscreen surface.

13. The seal system of claim 12, wherein said seal body is compressed by about 50% of its free volume.

14. The touchscreen system of claim 1, wherein said seal space is not substantially interior to or otherwise further radial to said window of said housing means, said space location avoiding puddle trap formation.

15. The touchscreen system of claim 1, wherein said seal body extends at least to an inner edge of said window.

16. The touchscreen system of claim 1, further comprising computational means to ignore x and/or y touch coordinates of an acoustic wave perturbation outside of the coordinates of said open window.

17. The touchscreen system of claim 1, further comprising a controller for determining a touch location and adaptively filtering an acoustic attenuation of seal sealing body.

18. The touchscreen according to claim 1, further comprising reflective arrays disposed parallel to sealing body, for deflecting acoustic energy across said touchscreen surface, said reflective arrays having a limited length to reflect acoustic energy along axes within areas bounded by said sealing body.

19. A surface acoustic wave touchscreen system comprising:

(a) a touchscreen having a touch surface;

(b) a housing, including a bezel having an aperture through which said touchscreen surface may be touched, said housing being for mounting said touchscreen;

(c) said bezel including an end surface spaced from said touchscreen touch surface by a seal space, said end surface not including a channel;

(d) a seal strip disposed in and filling said seal space; and (e) an adhesive, disposed essentially between and adhering said seal strip to said end surface, without an exposed portion proximate to said aperture.

20. The touchscreen of claim 19, wherein said seal strip comprises a body of closed cell foam sheathed on at least one surface by a water impervious film.

21. The touchscreen of claim 19, wherein said seal strip comprises a body of closed cell polyolefin foam sheathed on at least one surface by a water impervious film.

22. The touchscreen of claim 19, wherein said seal strip comprises a body of expanded PTFE.

23. The touchscreen system of claim 19, wherein said seal strip is of a predetermined width and said bezel end surface is of a width at least equal to said predetermined width of said seal strip.

24. The touchscreen system of claim 19, wherein said seal strip has a predetermined width and said bezel end surface has a width at most equal to said predetermined width of said seal strip.

25. The touchscreen system of claim 24, wherein said predetermined width of said seal strip is wider than said width of said bezel end surface and a positioning of said seal strip is such that said seal strip extends out beyond each side of said bezel end surface.

26. The touchscreen system of claim 25, wherein said transfer adhesive is applied to said end surface of said bezel and said seal strip is secured to said transfer adhesive by applying a pressure therebetween, said seal strip having a water impervious barrier disposed adjacent to said touchscreen surface.

27. The touchscreen system according to claim 26, wherein said seal strip further comprises a second water impervious barrier disposed adjacent said contact adhesive.

28. A method of providing a seal between an end surface of a bezel and an open touchscreen touch surface, comprising:

(a) fabricating a seal strip with a body of closed cell foam having at least one surface of said body with a water impervious barrier;

(b) positioning the seal strip between an end surface of the bezel and a touch surface of the touchscreen, defining an open area, so that the water impervious barrier is disposed against the touch surface of the touchscreen; and (c) adhering the seal strip to the end surface of the bezel with an adhesive, disposed essentially between the seal strip and the end surface, without an exposed portion proximate to the open area.

29. The method according to claim 28, further comprising the step of providing a second water impervious barrier on said seal strip, disposed adjacent the bezel end surface.

30. The method of claim 28, further comprising the step of attaching the seal strip to the bezel end surface with a transfer adhesive.

31. The method of claim 28, further comprising the step of fabricating the seal strip to a width wider than the width of said bezel end surface and applying the seal strip to the bezel end surface so as to extend beyond the bezel end surface width on each side.

32. The method of claim 31, further comprising the step of applying the seal strip to the bezel end surface as a continuous strip, completely around said bezel end surface.

33. The method of claim 31, further comprising the step of applying the seal strip to the bezel end surface as a continuous strip, disposed on a lower portion of the bezel end surface.

34. The method of claim 28, further comprising the step of ignoring any x and/or y acoustic wave perturbation coordinates outside of the coordinates of the open area of the touchscreen touch surface.

35. The method of claim 28, further comprising the step of adaptively filtering an acoustic attenuation of seal sealing body.

36. The method of claim 28, further comprising the step of limiting a location of reflective arrays provided on the touchscreen to reflect acoustic energy along axes within the open area bounded by the tape.

* * * * *

UNITED STATES PATENT AND TRADEMARK OFFICE
CERTIFICATE OF CORRECTION

| | | |
|---|---|---|
| PATENT NO. | : 5,784,054 | Page 1 of 1 |
| APPLICATION NO. | : 08/621127 | |
| DATED | : July 21, 1998 | |
| INVENTOR(S) | : Armstrong et al. | |

It is certified that error appears in the above-identified patent and that said Letters Patent is hereby corrected as shown below:

Title page,
(73) Assignee: "Elo ToughSystems, Inc." should read --Elo TouchSystems, Inc.--.

Signed and Sealed this
Twenty-seventh Day of November, 2012

David J. Kappos
*Director of the United States Patent and Trademark Office*